US008533061B2

(12) United States Patent
Asher et al.

(10) Patent No.: US 8,533,061 B2
(45) Date of Patent: Sep. 10, 2013

(54) SYSTEMS AND METHODS FOR AUTOMATED INTERNET-BASED AUCTIONS

(75) Inventors: Joseph M. Asher, New York, NY (US); Howard W. Lutnick, New York, NY (US)

(73) Assignee: BGC Partners, Inc, New York, NY (US)

( * ) Notice: Subject to any disclaimer, the term of this patent is extended or adjusted under 35 U.S.C. 154(b) by 69 days.

(21) Appl. No.: 12/208,189

(22) Filed: Sep. 10, 2008

(65) Prior Publication Data

US 2009/0006221 A1 Jan. 1, 2009

Related U.S. Application Data

(63) Continuation of application No. 10/629,128, filed on Jul. 29, 2003, now Pat. No. 7,440,912.

(60) Provisional application No. 60/459,834, filed on Mar. 31, 2003.

(51) Int. Cl.
*G06Q 30/00* (2012.01)

(52) U.S. Cl.
USPC ........................................................ 705/26.3

(58) Field of Classification Search
USPC ................ 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
See application file for complete search history.

(56) References Cited

U.S. PATENT DOCUMENTS

| | | | |
|---|---|---|---|
| 5,663,547 A | 9/1997 | Ziarno | |
| 5,696,366 A | 12/1997 | Ziarno | |
| 5,803,500 A | 9/1998 | Mossberg | |
| 5,835,896 A * | 11/1998 | Fisher et al. | 705/37 |
| 6,134,548 A | 10/2000 | Gottsman et al. | |
| 6,208,976 B1 * | 3/2001 | Kinebuchi et al. | 705/15 |
| 6,243,691 B1 | 6/2001 | Fisher et al. | |
| 6,266,652 B1 | 7/2001 | Godin et al. | |
| 6,358,147 B1 * | 3/2002 | Jaffe et al. | 463/20 |
| 6,415,269 B1 | 7/2002 | Dinwoodie | |
| 6,449,601 B1 | 9/2002 | Friedland et al. | |
| 6,704,713 B1 | 3/2004 | Brett | |
| 7,136,833 B1 * | 11/2006 | Podsiadlo | 705/37 |
| 7,146,331 B1 * | 12/2006 | Young | 705/26.3 |
| 7,197,476 B2 * | 3/2007 | Le et al. | 705/26 |
| 7,693,755 B2 * | 4/2010 | Karr | 705/26.3 |
| 7,734,505 B2 | 6/2010 | Miller et al. | |

(Continued)

FOREIGN PATENT DOCUMENTS

EP        1041502        10/2000

OTHER PUBLICATIONS

No Author "eye media, inc. Releases Oracle and Linux Versions of Virtual Auctioneer(TM) Software." PR Newswire, Oct. 4, 2000. Retrieved from Dialog File 16, Acc#: 07870026.*
U.S. Appl. No. 10/629,128, filed Jul. 29, 2003, Asher et al.

(Continued)

*Primary Examiner* — Naeem Haq

(57) ABSTRACT

The present invention relates to systems and 5 methods for implementing an automated auction process that is held at a designated time on the Internet, and that ends after bidding has been completed. In accordance with these systems and methods, a server connected to a plurality of workstations may establish 10 several auctions that allow for efficient trading of multiple goods, while simulating the live and dynamic setting of traditional auctions.

27 Claims, 9 Drawing Sheets

(56) References Cited

U.S. PATENT DOCUMENTS

| | | | |
|---|---|---|---|
| 8,036,949 B2* | 10/2011 | Nassiri | 705/26.3 |
| 2001/0044771 A1* | 11/2001 | Usher et al. | 705/37 |
| 2002/0062276 A1 | 5/2002 | Krueger et al. | |
| 2002/0115449 A1 | 8/2002 | Allen | |
| 2002/0116320 A1* | 8/2002 | Nassiri | 705/37 |
| 2002/0128952 A1 | 9/2002 | Melkomian et al. | |
| 2003/0041004 A1* | 2/2003 | Parry et al. | 705/37 |
| 2003/0041005 A1* | 2/2003 | Parry et al. | 705/37 |
| 2003/0074330 A1 | 4/2003 | Asokan et al. | |
| 2003/0078793 A1 | 4/2003 | Toth | |
| 2003/0105682 A1* | 6/2003 | Dicker et al. | 705/27 |
| 2003/0220867 A1 | 11/2003 | Goodwin et al. | |
| 2003/0225669 A1 | 12/2003 | Cohen | |
| 2004/0054551 A1* | 3/2004 | Ausubel et al. | 705/1 |
| 2006/0206408 A1* | 9/2006 | Nassiri | 705/37 |
| 2006/0287924 A1 | 12/2006 | Admon | |
| 2007/0192233 A1 | 8/2007 | Salant | |
| 2008/0071632 A1* | 3/2008 | Karr | 705/26 |
| 2010/0203941 A1* | 8/2010 | Darrah et al. | 463/16 |
| 2010/0217687 A1* | 8/2010 | Garafola | 705/27 |
| 2010/0255899 A1* | 10/2010 | Paulsen | 463/25 |
| 2013/0159130 A1* | 6/2013 | Gaur et al. | 705/26.4 |
| 2013/0172066 A1* | 7/2013 | Darrah et al. | 463/16 |

OTHER PUBLICATIONS

U.S. Appl. No. 10/816,238, filed Apr. 1, 2004, Asher, et. al.
eBay, eBay Inc., at http://www.ebay.com (printed Jul. 28, 2003).
Bidz, Bidz, Inc., at http:///web-1.bidz.com (printed Jul. 28, 2003).
Blue Moon Interactive: Internet Archive Wayback Machine, www.archive.org/.../www.bluemooninteractive.com; Apr. 23, 1999, 5 pgs.
Abelauctions: Internet Archive Wayback Machine, www.archive.org/.../www.ableauctions.com; Jun. 1, 2002, Aug. 2, 2002, 5 pgs.
O'Brien, Dan; "Denver-base newspaper chain to advertise silent, online auction" Knight Ridder Tribune Business News, Mar. 28, 2003, Proquest #31962931, 3 pgs.
Notification of Transmittal of the International Search Report and the Written Opinion of the International Searching Authority for Intenational Application No. PCT/US05/11198; 7 pages (Oct. 3, 2006).
USPTO Office Action for U.S. Appl. No. 10/629,128, Jun. 13, 2006 (5 pages).
USPTO Office Action for U.S. Appl. No. 10/629,128, Aug. 11, 2006 (13 pages).
USPTO Office Action for U.S. Appl. No. 10/629,128, Feb. 5, 2007 (9 pages).
USPTO Advisory Action for U.S. Appl. No. 10/629,128, May 30, 2007 (3 pages).
USPTO Office Action for U.S. Appl. No. 10/629,128, Jan. 3, 2008 (9 pages).
Notice of Allowance for U.S. Appl. No. 10/629,128; Jul. 31, 2008 (9 pages).
U.S. PTO Office Action for U.S. Appl. No. 10/816,239; Mar. 5, 3009; (10 pages).
U.S. PTO Office Action for U.S. Appl. No. 10/816,239; Apr. 6, 2007; (14 pages).
U.S. PTO Office Action for U.S. Appl. No. 10/816,239; Sep. 8, 2006; (9 pages).
U.S. PTO Office Action for U.S. Appl. No. 10/816,239; Nov. 19, 2007; (11 pages).
Yahoo! Auctions, Yahoo! Inc., at http//auctions.shopping.yahoo.com (printed Jul. 28, 2003).
Notice of Allowance for U.S. Appl. No. 10/816,238; May 29, 2009 (10 pages).
CA Office Action for Application No. 2460320; Aug. 18, 2010; 7 pages.
U.S. PTO Office Action for U.S. Appl. No. 12/479,161 dated Apr. 1, 2011; 11 pages.
U.S. PTO Office Action for U.S. Appl. No. 12/479,161 dated May 17, 2012; 17 pages.
CA Office Action for Application No. 2460320; Feb. 28, 2012; 7 pages.
U.S. PTO Office Action for U.S. Appl. No. 12/208,189 dated Apr. 3, 2013; 6 pages.

\* cited by examiner

SYSTEMS AND METHODS FOR AUTOMATED INTERNET-BASED AUCTIONS

CROSS-REFERENCES TO RELATED APPLICATIONS

This application is a continuation of U.S. application Ser. No. 10/629,128 filed on Jul. 29, 2003 now U.S. Pat. No. 7,440,912, which is incorporated by reference herein in its entirety, which claims priority to U.S. Provisional Application Ser. No. 60/459,834 filed Mar. 31, 2003, entitled "Systems And Methods For Automated Internet-Based Auctions."

BACKGROUND OF THE INVENTION

The present invention relates to systems and methods for implementing automated auction processes that may be conducted electronically.

There have been many different approaches adopted to fairly bring buyers and sellers together in a manner that is economically efficient. A main objective of such approaches is to allow transactions to be conducted as close as possible to the market price of the goods. Generally, the market price can be achieved by permitting full access to the transaction by essentially all potential educated buyers and sellers. However, the buyer/seller transaction must be structured to operate at a very low cost, or it will distort the price of goods. Therefore, some key elements in promoting effective buyer/seller transactions may conflict, thereby necessitating trade-offs between trading efficiency and market knowledge.

An auction is a well known method that brings buyers and sellers together in transacting a sale of goods. Traditionally, this process has involved the gathering of potential buyers in one location, known as an auction house, where select goods are presented to them by an auctioneer that calls for bids. At the floor of an auction, potential buyers compete for an auctioned item by bidding for it, sometimes with the assistance of bid spotters. The auctioned item is sold to the highest bidder once the auctioneer bangs a gavel i.e., once the hammer falls. Afterwards, an auction attendant assists the winning bidder with the required formalities and the auction house assists in collecting the item the bidder has won, thereby completing the transaction.

Although successful in creating an exciting forum wherein interested parties compete for an item, the traditional auction process suffers from various disadvantages. Participants must be physically assembled at an auction site. Attending an auction is therefore not only time consuming but also expensive, as it may be associated with transportation costs. As a result, fewer buyers may attend and the true market price of the auctioned item may not be achieved.

In an effort to make auctions more convenient, some auction houses allow potential buyers or bidders to submit their bids over the telephone or the Internet, so that they need not be physically present at a particular auction house. Moreover, such bids may be placed in advance—i.e., bidders need not submit their bids while the auction is taking place. By allowing bidders to submit their maximum bids via telephone, mail, facsimile or email, the process of bidding becomes less expensive and may save time. However, such a process may hinder a bidder's ability to increase his or her bid in response to competitive bids received from the floor as it also takes away from the excitement of being physically present at the auction. Not only do the limitations of the previous auction schemes lead to lower selling prices, but they also require the presence of a live auctioneer to conduct the auction.

More recently, Internet-based auctions have been made possible where sellers post descriptions and pictures of items they intend to sell, while buyers browse through such items and enter bids electronically. Such a scheme is particularly useful when there are no established trading locations for the select items. In addition, most Internet-based auctions are automated in that they do not require the presence of a live auctioneer. Compared to traditional auctions that have been the dominant trading form for exotic items such as rare pieces of art, antiques and the like, electronic auctions not only allow for a significant number of users to participate in the auctioning of a good, but may also be used for trading almost all kinds of goods. Moreover, Internet-based auctions allow for multiple users to bid for or sell multiple items substantially simultaneously.

In Internet-based auctions, bidding for a specific item typically starts when the item is posted by a seller and ends at a predetermined time. Bidders are permitted to bid up to the designated end time, where the winning bid is the highest bid at such time. In such a process, bidders often struggle to outbid each other close to the designated end time of the auction. As a result, processing errors or delays may occur, certain bids may not be entered, and the true market price of the auctioned item may not be achieved. Moreover, this type of auction may also lack an element of excitement that is present throughout a traditional auction.

A reverse auction is a variation of the auction process that may be used in Internet-based auctions. At the start of such a process, the price of the auctioned item is set at a predetermined value and decreases in predetermined decrements during the auction. Such a process typically takes place over a relatively short period of time during which each potential buyer is provided with the current price and the time remaining until the auction is concluded. Although more exciting and dynamic than typical Internet-based auctions, reverse auctions are associated with large activity as the auction nears its conclusion. This again may lead to the item selling at a sub-optimal price and may increase the risk of processing errors.

It would therefore be desirable to provide automated Internet-based auction systems and methods that allow for efficient and simultaneous trading of multiple goods, while simulating the live and dynamic setting of a traditional auction.

SUMMARY OF THE INVENTION

It is an object of this invention to provide automated auction systems and methods that may be implemented on the Internet.

It is another object of this invention to provide automated auction systems and methods that allow for multiple participants to trade multiple items substantially simultaneously and at low costs.

It is still another object of this invention to provide automated auction systems and methods that result in the trading of items at optimal prices while incurring the least possible number of errors.

It is yet another object of this invention to provide automated auction systems and methods that simulate the live and dynamic setting of a traditional auction, while still allowing participants to submit advance bids.

The above and other objects of the present invention are preferably realized in a computer-based processing system for implementing several auction processes that may be each held at an auction site on the Internet at a designated time and date. A sample auction process may control and display an animated automated character in the role of an auctioneer.

Product information relating to an item or group of items being auctioned may also be displayed. After the animated auctioneer announces the start of the auction, the auction process may receive bids from multiple bidders participating in the auctioning of the item(s) The animated auctioneer may continue to announce the current bid based on the received bids until bidding appears to have stopped by virtue of the fact that there have been no additional bids after the expiration of a pre-determined amount of time from the last bid.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention is directed to methods for implementing an automated auction process that may be conducted electronically. Potential sellers may enter one or more items to be auctioned. Once the auction for a specific item or group of items is held, potential buyers may bid on such items. Animated automated characters may be displayed to auction participants and play the role of an auctioneer, a bid spotter and an auction attendant in conducting the automated auction preferably on the Internet.

The present invention is also directed to systems for implementing the automated auction process. The first aspect of such systems relates to a hardware arrangement that may provide a platform for buyers and sellers to participate in the auction process and display the auctioned items as well as the animated characters conducting the auction. The second aspect of the systems relates to a governing logic that is stored in the system memory and that may provide a sequence of protocols and rules that control the auction process and the animated characters.

Figure 1:
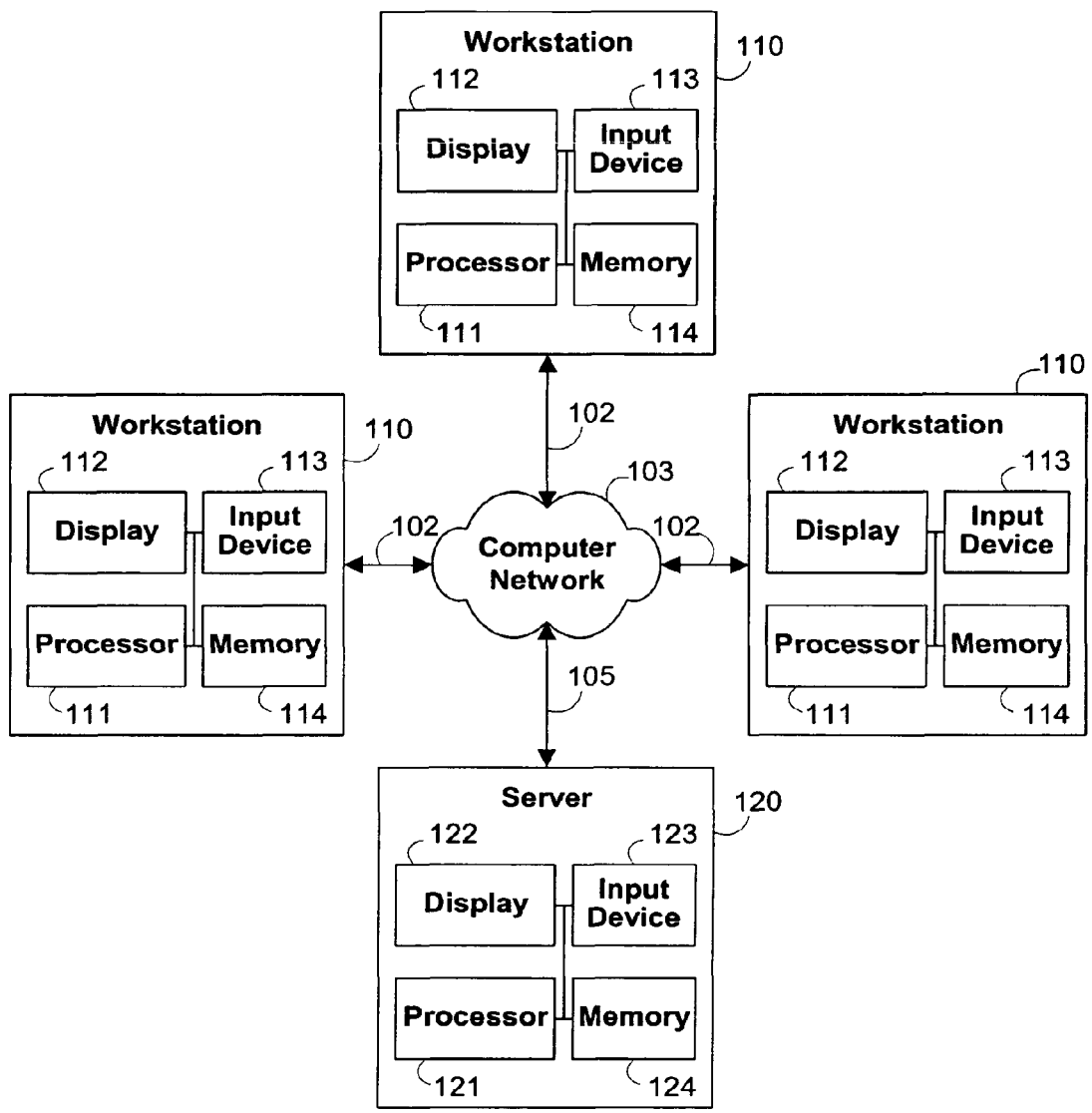
FIG. 1 is a block diagram of a system that may be used to implement the processes and functions of certain embodiments of the present invention.

Referring to FIG. 1, exemplary system 100 for implementing the present invention is shown. As illustrated, system 100 may include one or more workstations 110. Workstations 110 may be local or remote, and are connected by one or more communications links 102 to computer network 103 that is linked via communications link 105 to server 120.

Server 120 may be any suitable server, processor, computer, data processing device, or combination of the same. Server 120 may be used to implement the governing logic that runs the auction process. Computer network 103 preferably includes the Internet but may consist of any suitable computer network such as an intranet, a wide-area network (WAN), a local-area network (LAN), a wireless network, a digital subscriber line (DSL) network, a frame relay network, an asynchronous transfer mode (ATM) network, a virtual private network (VPN), or any combination of the same. Communications links 102 and 105 may be any communications links suitable for communicating data between workstations 110 and server 120, such as network links, dial-up links, wireless links, hard-wired links, etc.

Workstations 110 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 110 may be used by participants to post items for sale or to enter into and proceed with the auctioning of such items.

A typical workstation 110 may include processor 111, display 112, input device 113, and memory 114, which may be interconnected. In a preferred embodiment, memory 114 contains a storage device for storing a workstation program for controlling processor 111. Input device 113 may be used by potential buyers to enter bids on desired items, or by potential sellers to post items they intend to sell. Processor 111 may use the workstation program to receive product and sale information relating to the auctioned item, and present on display 112 auction information such as the current highest bid, the minimum acceptable opening bid, the minimum acceptable incremental, the auction commencement time and/or the length of time that has passed since the beginning of the auction. Display 112 may also be used to exhibit animated auctioneers, animated bid spotters and/or auction attendants to participants when appropriate.

Server 120, which may be maintained by an auction host, may include processor 121, display 122, input device 123, and memory 124, which may be interconnected. In a preferred embodiment, memory 124 contains a storage device for storing auction information and user information as well as a server program that provides the governing logic for controlling processor 121. Processor 121 may use the server program to establish auctions for specific items, allow participants to partake in the auction, sort and accept bids on such items, enter bids on behalf of potential bidders and automatically control several aspects of the electronic auctions. Processor 121 further creates and controls the automated auctioneers, bid spotters and auction attendants pertaining to the various auctions.

In a preferred embodiment of the present invention, the auction may take place on the Internet's World Wide Web at an auction site maintained by the auction host, as described and shown in FIGS. 2-9. These figures describe processes and illustrate screens that may be implemented by and displayed on system 100 of FIG. 1, in accordance with the principles of the present invention.

Figure 2:
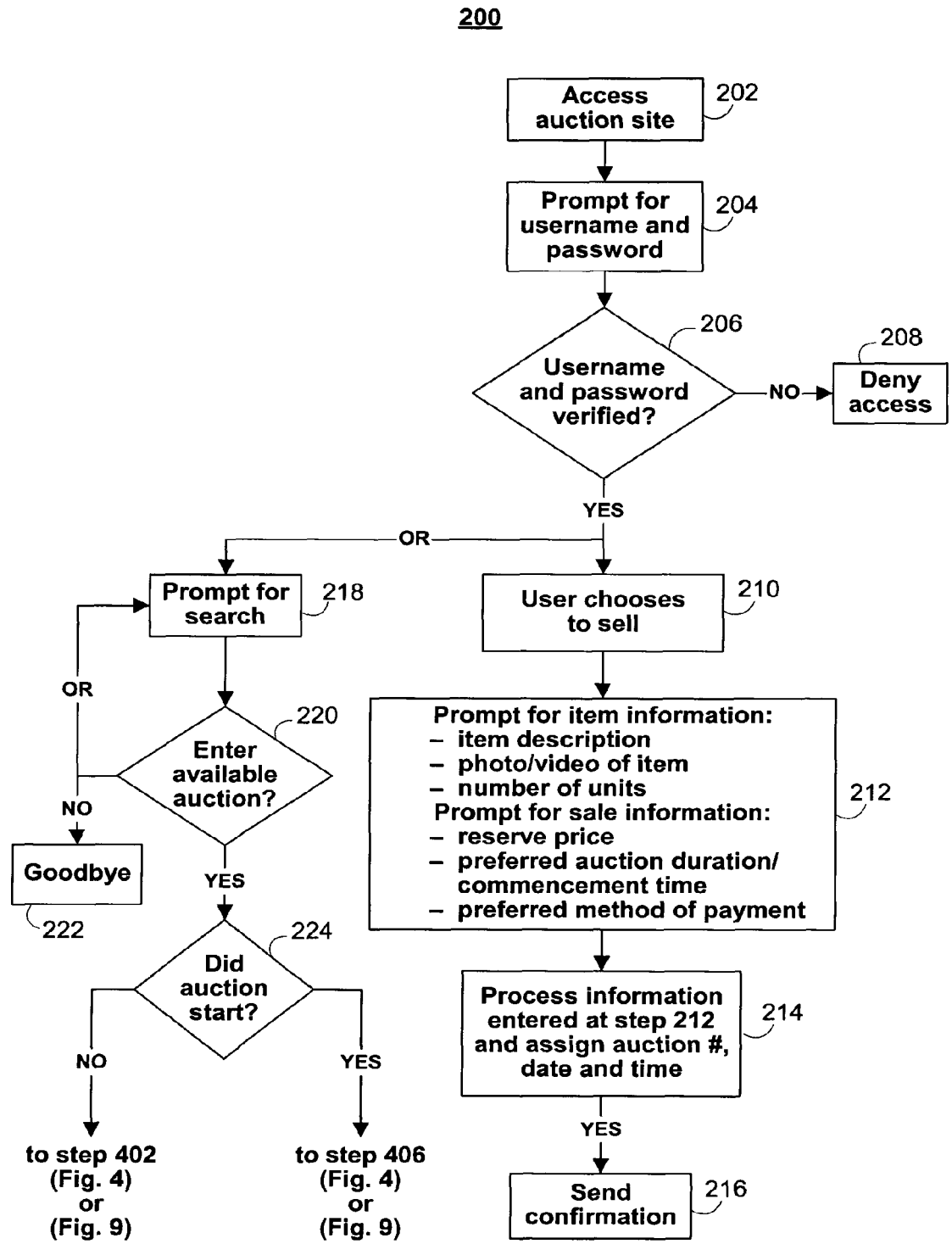
FIG. 2 is a preferred flow diagram of a process that may be used to establish or enter an auction in accordance with certain embodiments of the present invention.

FIG. 2 partly describes a process 200 by which an auction is created for an item posted by a potential seller. At step 202 of process 200, a potential seller may access the online auction site through workstation 110 of FIG. 1. She may then be prompted for a username and password at step 204. The seller may then enter the required information which is communicated to server 120 of FIG. 1. At step 206, a determination is made as to whether the entered username and password are valid. If the verification process is unsuccessful, the seller may be denied access at step 208. If the verification process is successful, her profile may be retrieved. She may then proceed to step 210 where she may indicate that she intends to sell an item by, for example, clicking on an appropriate link on the site.

After step 210, the seller may be directed to enter information relating to the item or items she wishes to sell at step 212. Such item or product information may include categorical classification, item description, photographs or video presentation of the items or a sample item, units of the item available for sale, etc. The seller may also be directed to enter certain information relating to the sale or delivery of the item(s) at step 212. Such sale information may include the preferred payment method, the preferred auction duration and commencement time, the seller's reserve price (if any), etc.

Once the seller enters the required information, the entered information may be communicated from workstation 110 to server 120 of FIG. 1. The information may then be automatically processed and one or more auction numbers, date and time for the sale of the item(s) are assigned at step 214 of FIG. 2. The assigning of an auction date and time may be based on a preset number of days, the seller's preferences, the nature of the item(s) being sold, the expected selling price(s) of the item(s) and/or the auction times assigned to other items. Because each auction is an automated process that may be implemented on networked terminals, multiple auctions for different items may be scheduled to start or run at the same time.

The minimum acceptable opening bid and the minimum acceptable incremental bid may also be determined at step 214. Alternatively, they may be determined at some other time before the start of the auction or at the start of the auction, based on the nature, expected selling price or value of the item(s) being auctioned, or based on the reserve price (if any) entered by the seller. The minimum acceptable incremental bid may also change as a function of the current bid during the auction. Confirmation of the setting of the auction date and time along with other auction information may be displayed or communicated to the seller at step 216. The seller may also be notified of the upcoming auction via email some time prior to the commencement of the auction.

Process 200 may also be used by a potential buyer in order to participate in an already established auction. A potential buyer may undergo steps 202, 204 and 206 of process 200 as well, according to the preferred embodiment of the present invention described in FIG. 2. This embodiment obviates the need for multiple access points to the auction site. If a potential buyer accesses the auction site in order to enter an auction or search for particular items being auctioned, he may enter a username and password, and proceed to step 218, where he may enter a search for an item scheduled for auction or an item being auctioned. The search may be based on a pre-assigned auction number, an item description, a general or specific category query, etc.

At step 220, the potential buyer may be queried as to whether he would like to enter a particular auction once he views search results by an animated auction attendant, such as the one described in connection with FIG. 3. If he does not choose to enter or if the auctioned item is not available either because bidding has been closed or has not been opened, the auction attendant may be automatically adapted to thank him for visiting the site and wish him goodbye at step 222. The potential buyer may alternatively conduct additional searches or as many searches as he may please. In addition, system 100 of FIG. 1 may be automatically adapted to conduct searches at step 218 of FIG. 2 on items available for auction based on the potential buyer's previous purchases and/or items in which he has demonstrated interest, as stored in the system memory in accordance with his profile.

If the potential buyer chooses to enter an available auction, the system may determine whether the auction has commenced at step 224. If the particular auction has not yet begun but is about to start, the process may continue to step 402 in FIG. 4 or FIG. 9. If the auction has begun, the process may continue to step 406 in FIG. 4 or FIG. 9. In either case, a screen such as exemplary screen 300 shown in FIG. 3 may be displayed to the buyer.

Figure 3:
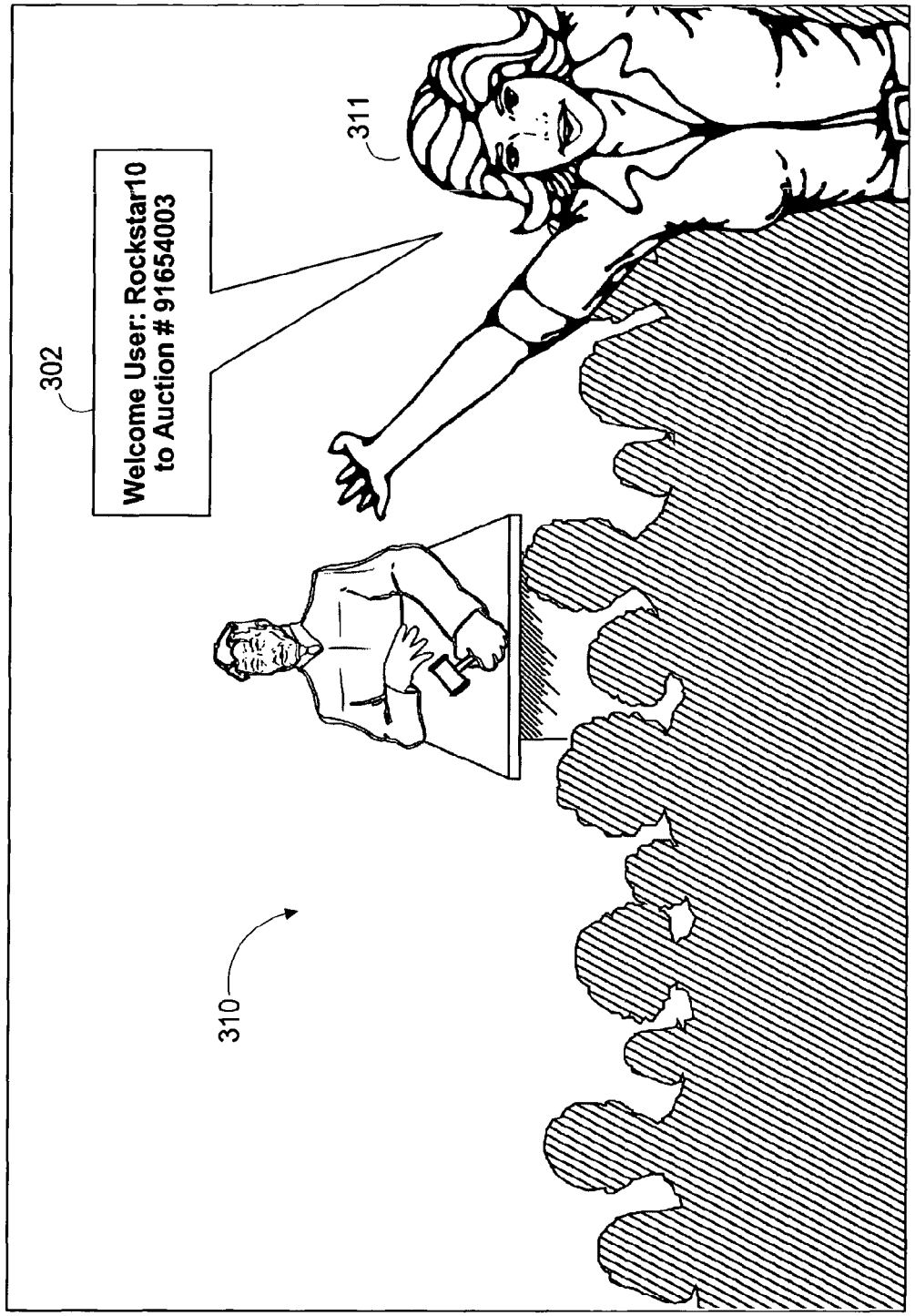
FIG. 3 is an illustration of an exemplary screen that may be displayed upon the entering of the auction process in accordance with certain embodiments of the present invention.

FIG. 3 illustrates an exemplary screen that the auction system may display to the potential buyer entering a particular auction on workstation 110 of FIG. 1. Screen 300 may include an animated character in the form of an auction attendant 311 welcoming the potential buyer to virtual auction room 310. Auction attendant 311 is automated and controlled by the controlling logic of system 100 depicted in FIG. 1. Auction attendant 311 of FIG. 3 may be adapted to welcome the potential buyer through the announcement made in window 302. Screen 500 of FIG. 5 may then be displayed to the potential buyer, following screen 300.

An auction attendant in the form of character 311 of FIG. 3 may be the default auction attendant that is displayed to the potential buyer entering an auction. Alternatively, the auction attendants of FIGS. 3 and 7, along with the bid spotter and auctioneer of FIG. 5, may be any animated characters that system 100 may generate based on the potential buyer's preferences, the potential buyer's profile or based on the item(s) being auctioned. For example, the auction attendant may be selected from a pre-configured set of genre-based characters. The auction attendant may be in the form of a man or a woman pertaining to a certain age group and having a certain demeanor. Alternatively, the auction attendant may be a cartoon 5 character or a character having the likeness of a famous personality or celebrity.

In the preferred embodiment illustrated in FIGS. 2 and 3, only registered users may participate in the auction process. Such registered users may be notified via email about the various auctions that are scheduled to take place and about specific auctions in which they have demonstrated interest. Such information may be stored in the system memory as part of their user profiles.

An unregistered participant who wishes to access the auction and who does not have a username or password may be prompted to create an account with the auction house hosting the site if he so desires. Such a process may require him to pay a fee and disclose certain user-related information that may be used to create a user profile. Alternatively, the process of creating a user account may be free-of charge. This may apply to both potential sellers and buyers. In addition to assigning a potential buyer a username and a password, the process of creating an account may involve receiving a shipping address and a preferred payment method that may be stored in the system memory, as part of the user profile. In addition, the buyer may select the animated characters he would like to have appear as discussed in relation to FIGS. 3, 5 and 7. Similarly, the process of creating an account for a potential seller may involve receiving a preferred payment method and other information that may be stored in the system memory as well. Account and profile information may be stored in the system memory, such as memory 124 of FIG. 1.

In another embodiment of the present invention designed to attract potential participants, users may access the auction site and not be prompted to enter a username or a password until they decide to either post an item for sale or enter a bid on an auction. In yet another embodiment of the present invention, unregistered users may access the auction site in order to buy certain items and need not undergo any of steps 202, 204 or 206 of FIG. 2. In that case, process 200 may start at step 218. In such an embodiment, only a potential seller may be prompted for a username and a password. In such an embodiment, steps 204 and 206 need not take place prior to step 210.

Figure 4:
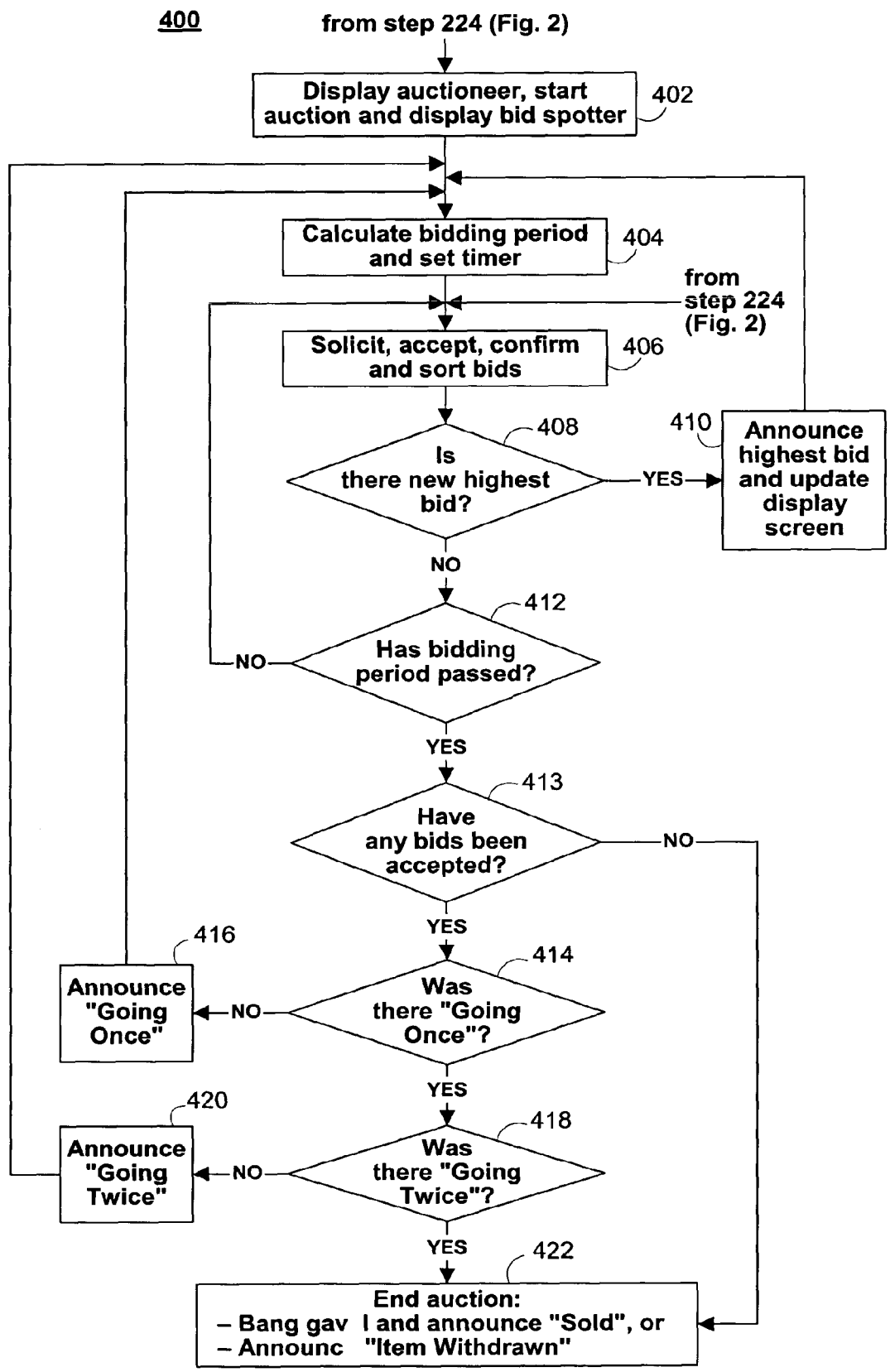
FIG. 4 is a preferred flow diagram of a process that may be used in the execution of an auction in accordance with certain embodiments of the present invention.
Figure 5:
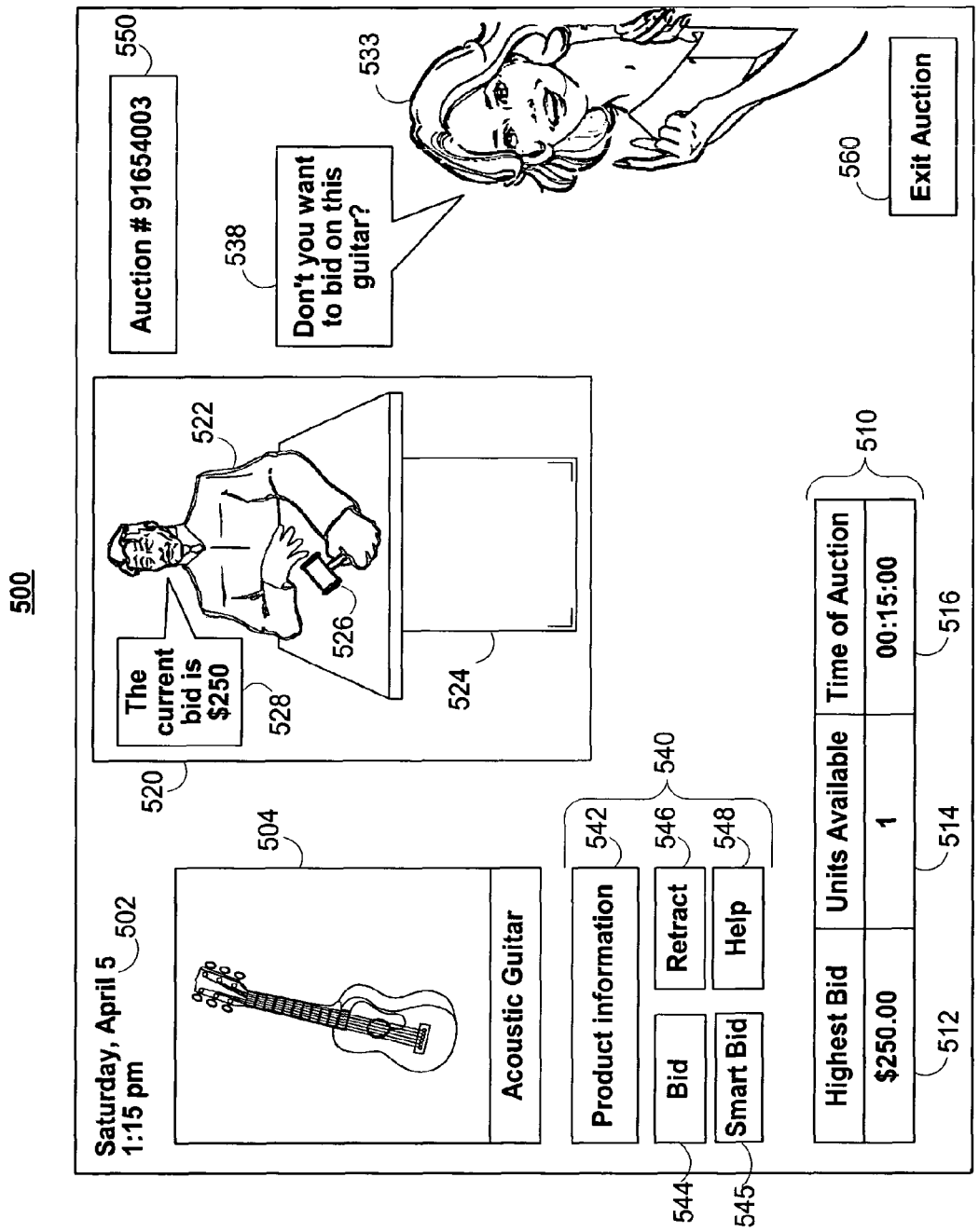
FIG. 5 is an illustration of an exemplary interactive screen that may be displayed during the auction process in accordance with certain embodiments of the present invention.

FIG. 4 describes a preferred process 400 that governs an automated auction. FIG. 5 illustrates an exemplary screen that the auction system may display to potential buyers or bidders on workstation 110 of FIG. 1, while the auction is taking place. Different portions of the screen displayed in FIG. 5 may change as process 400 of FIG. 4 goes from one step to another. Participants who attempt to enter the auction at or right before the auction starting time may be allowed to enter the auction prior to the occurrence of step 402 of process 400, as indicated by the arrow from step 224 of process 200, in the event that the answer to the question of step 224 of FIG. 2 was in the negative. The auctioning of a particular item or group of items may start at step 402 of process 400 at the time and date designated at step 214 of FIG. 2. At that time, screen 500 of FIG. 5 may be displayed to each potential buyer participating in the auction.

Screen 500 of FIG. 5 may include window 504 that displays a picture of the item or a sample item being auctioned as well as a brief description of the item. Screen 500 may display the current time and date in region 502, the auction number in window 550, and may include window 510. Window 510 may display the current highest bid in region 512, the current number of units of the item that are available for auction in region 514, and the length of time that has passed since the start of the auction in region 516. Screen 500 is interactive in that it may contain buttons 540 that enable participants to, for example, place a bid via Bid button 544 or Smart Bid button 545, retract a bid via Retract button 546, query for help via Help button 548 or for more information about the product via Product Information button 542. Screen 500 may be updated as different parameters, such as the highest bid price and the units available, change as the auction proceeds. Screen 500 may also include Exit Auction button 560 that allows the potential buyer to exit from the particular auction and that conceals screen 500 upon confirmation.

Screen 500 may also include window 520 that displays an animated character in the form of an auctioneer 522 presiding over the auction behind table 524, and holding gavel or hammer 526. Auctioneer 522 is automated and controlled by the controlling logic of system 100 depicted in FIG. 1. An auctioneer in the form of the character 522 may be the default character that is displayed to the potential buyer. Alternatively, the auctioneer may be any animated character that system 100 may generate based on the potential buyer's preferences, profile or on the item(s) being auctioned.

At the start of the auction, auctioneer 522 of FIG. 5 may announce that the auction has started. Like all subsequent announcements made by auctioneer 522, such an announcement may be heard through the workstation speakers utilized by every participant and may be displayed in region 528 of window 520 to every participant. Auctioneer 522 may also announce the item(s) being sold, the minimum acceptable opening bid and the minimum acceptable incremental bid thereafter, as determined at step 214 of FIG. 2. In addition, auctioneer 522 may announce whether the auction is a reserve auction as well as other relevant rules pertaining to the auction. Such rules may be accessed by a bidder at any time during the auction process by pressing on Help button 548.

Screen 500 of FIG. 5 may also display an animated character in the form of a bid spotter 533 that may appear once the auction starts at step 402 of FIG. 4, or later during the auction at step 406 of FIG. 4. Bid spotter 533 is automated and controlled by the controlling logic of system 100 depicted in FIG. 1. A bid spotter in the form of the character 533 may be the default character that is displayed to the potential buyer. Alternatively, the bid spotter may be any animated character that system 100 of FIG. 1 may generate based on the potential buyer's preferences, profile or on the item(s) being auctioned. Bid spotter 533 of FIG. 5 may solicit bids and make announcements at various stages of the auction as described below. Such announcements be heard through the workstation speakers of a particular participant entering a bid and may be displayed in region 538 of screen 500 to that same participant. In an alternative embodiment, auctioneer 522 may perform some or all the functions of a bid spotter instead of bid spotter 533.

Referring back to process 400 of FIG. 4, after the auction has started at step 402, a predetermined time period during which bids may be accepted is calculated at step 404. The pre-determined time period, which may be also known as the bidding period, may be calculated based on the current highest bid, the minimum acceptable opening bid, the minimum acceptable incremental bid and/or the number of current participants. The bidding period may be updated at different stages of the auction based on the amount of bidding activity i.e., the number of received bids, the previously calculated bidding period, and whether announcement "Going Once" or "Going Twice" was made, as described below. In addition, a timer may be set for counting down the bidding period at step 404. The expiration of the timer may indicate that bidding has stopped either because no successful bid was established, or because no higher bid was entered.

Participants who have not entered the auction at the auction starting time may be allowed to enter the auction after step 404 of process 400, as indicated by the arrow from step 224 of process 200, in the event that the answer to the question of step 224 of FIG. 2 was in the positive. Potential buyers who do not participate in the auction at the time it is held may submit advance bids prior to the auction starting time.

An advance bid may be the highest amount of money a potential buyer is willing to pay for the item being auctioned. The potential buyer may have the option of submitting his advance bid as a Smart Bid. In doing so, the potential buyer may specify a level of improvement he wishes to have applied. If the user does not specify the level of improvement, his bid may be assigned a default improvement level. The improvement level may be implemented as described in copending commonly assigned U.S. patent application Ser. No. 10/171,009, filed Jun. 11, 2002 and provisional patent application No. 60/463,835 filed Apr. 16, 2003, which are hereby incorporated by reference herein in their entireties.

At step 406 of FIG. 4, process 400 may receive and arrange bids entered by various buyers. Bid spotter 533 of FIG. 5 may solicit individual participants as described below, and may announce the bid entered by a particular participant to auctioneer 522 as a form of confirmation to the participant that his bid was entered and received. This announcement may be audible to and readable by the participant placing the bid. In the event that advance bids have been submitted by potential buyers, they may also be received at step 406 of FIG. 4.

Each received bid may b~ registered based on the bidder who entered it, the amount it is for, the time it was entered, and/or whether it is an advance bid. Each bid may also be validated—e.g., the system may check whether the bid is over the sum of the minimum acceptable incremental bid and the most recent current highest bid. In the event that two or more bids are equal in amount, the bid that was received first may be given higher priority.

Advance bids may be modified and placed at the next allowable bid amount, up to the maximum amount authorized by the bidder. The next allowable bid amount may be calculated by adding the minimum acceptable incremental bid to the current highest bid. In the event the bidder submitted an advance bid under the Smart Bid option, his bid may be modified and placed at a higher bid amount, without exceeding the maximum amount authorized by the bidder. The higher bid amount may be calculated by multiplying the minimum acceptable incremental bid by a variable factor, and adding the result to the current highest bid. The factor may be chosen based on the improvement level selected by the bidder, the current highest bid and/or the maximum amount authorized by the bidder. Alternatively, the advance bid may be modified under the Smart Bid option in any other way that ensures that the highest amount the advance bidder is willing to pay for the item is entered as a valid bid by the system.

In the event that an advance bid is equal to the highest bid entered by a participant, the advance bid mayor may not be given priority over that highest bid. In the event that two or more advance bids are equal in amount, the bid that was entered first may be given higher priority. Alternatively, in the event that two or more bids are equal in amount, the bid entered by the more established bidder—i.e., the user who has placed more bids, placed bids on more items, participated in more auctions, etc. may be given higher priority.

In order for a potential buyer participating in the auction to place a bid on the item(s) being auctioned, he may press Bid button 544. His bid may be placed at the next allowable bid amount based on the minimum acceptable incremental bid, or may be received as entered by the bidder through his keyboard. However, before the bid may be received by the system, the individual bidder may be asked to confirm his bid through screen 600 of FIG. 6.

Smart Bid button 545 provides another way for the potential buyer to place a bid on the item(s) being auctioned. Smart Bid button 545 may give the potential buyer the option of placing a bid that the system determines while bidding is taking place and may be particularly useful when the current highest bid is nearing the maximum amount the potential buyer may be willing to pay for the item(s) or when there may not be enough time for the potential buyer to successfully enter his desired bid on the item(s).

More specifically, when the Smart Bid button is pressed, the system may enter a bid on behalf of the potential buyer that is higher than the sum of the minimum acceptable incremental bid and the current highest bid, without exceeding the maximum amount the potential buyer is willing to pay for the item. The bid entered by the system on behalf of the user may be based on bids entered by other potential buyers, the current highest bid, the minimum acceptable incremental bid and/or the maximum amount authorized by the bidder. In a preferred embodiment, when the Smart Bid button is pressed, the potential buyer may be prompted to enter the maximum amount he is willing to pay and the system may then calculate and enter an appropriate bid by multiplying the minimum acceptable incremental bid by a variable factor, and adding the result to the current highest bid. The factor may be chosen based on the improvement level, as described above.

For example, if the current bid is $80, the minimum acceptable incremental bid is $5 and the maximum amount a first bidder—bidder A—is willing to pay is $100, the Smart Bid option may allow a bid for $90 to be entered on behalf of bidder A. If bidder A had entered a bid for $85, another bidder—bidder B—may enter a bid for $90, which would still allow bidder A to enter a bid for $100 under the Smart Bid option. However, if bidder A enters a bid for $95 instead, then bidder B may enter a bid for $100, thereby preventing bidder A from entering the amount he was willing to pay for the item being auctioned. The Smart Bid option may therefore be implemented in such a way that ensures that a bid for $100 for the item is ultimately entered on behalf of bidder A as a valid bid.

Figure 6:
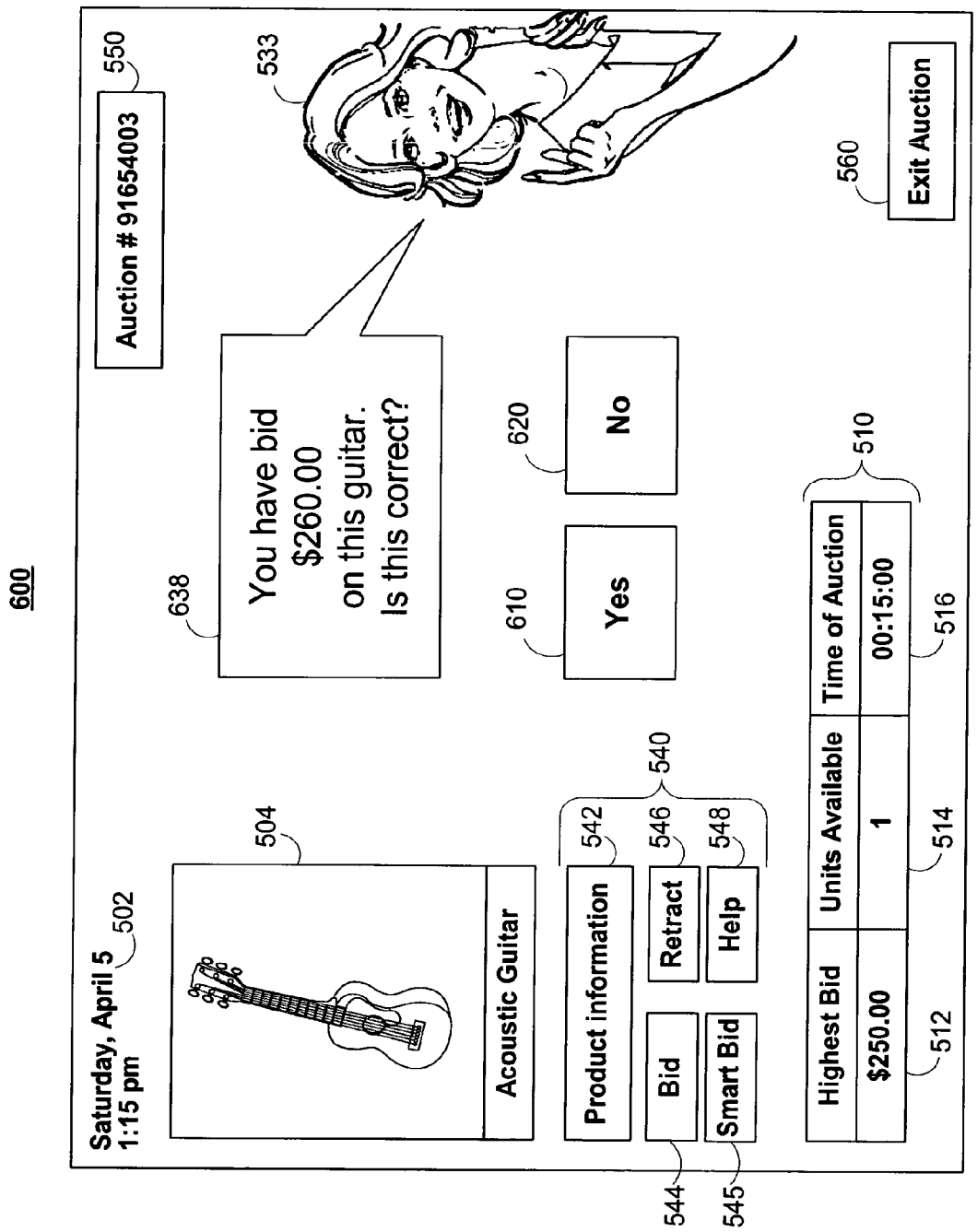
FIG. 6 is an illustration of another exemplary interactive screen that may be displayed during the auction process in accordance with certain embodiments of the present invention.

Screen 600 of FIG. 6 may be displayed to the particular bidder after he enters his bid. Screen 600 may include some of the elements of screen 500. In addition, screen 600 includes window 638 and buttons 610 and 620. Bid spotter 533 may be adapted to ask the bidder to confirm whether the bid he entered is correct through the announcement made in window 638. The bidder may confirm his bid by pressing Yes button 610 or may cancel his bid by pressing No button 620. If the buyer presses Yes button 610, then his bid may be received at step 406 of FIG. 4.

After step 406, process 400 may determine whether a new highest bid was established at step 408, and if so, continues to step 410. A bidder may be allowed to retract his bid. The bidder may do so by pressing on Retract button 546 of FIG. 5 before the bidding period expires. In such an event, process 400 of FIG. 4 may have to recalculate the new highest current bid without reviving the previous highest current bid.

At step 410 of FIG. 4, auctioneer 522 of FIG. 5 may announce to all participants the current highest bid, while region 512 may be updated to reflect it. As mentioned above, the minimum acceptable incremental bid may be a function of the current highest bid or may be fixed at or before the beginning of the auction process. In either case, the minimum acceptable incremental bid may also be announced by auctioneer 522 at step 410 of FIG. 4. Auctioneer 522 mayor may not announce the identity of the participant who placed the highest bid, depending on the rules applicable to the particular auction. In the event that the highest bid is an advance bid, an email may be automatically sent to the bidder who placed the bid. After step 410, process 400 may go back to step 404 where the bidding period may be recalculated based on the current highest bid and the amount of bidding activity.

In addition, the timer may be reset for counting down the newly calculated bidding period at step 404.

In an alternative embodiment, process 400 need not recalculate the bidding period at step 404 and may reset the timer according to the previously calculated bidding period at step 404. In yet another alternative embodiment, the bidding period may be chosen to be a fixed time period throughout the entire auction process and need not be calculated at step 404.

After undergoing step 404 again, process 400 may solicit bids at step 406 by causing bid spotter 533 of FIG. 5 to address a participant who had previously adapted to ask the participant whether he wants to raise his bid or may suggest an amount based on the placed a bid on the item. Bid spotter 533 may be minimum acceptable incremental bid. The participant may select the amount suggested by pressing on Bid button 544 and may be asked to confirm his bid through screen 600, as described in connection with FIG. 6.

The exemplary screen 500 shown in FIG. 5 depicts an acoustic guitar, shown in window 504, being auctioned. In this example, the auctioneer 522 is announcing that the current highest bid for the guitar is $250.00, which is also reflected in region 512. It can be deduced from regions 516 and 502 that the auction started on Saturday April 5, at 1:00 pm and has been ongoing for 15 minutes. Bid spotter 533 is soliciting the participant to bid by making the announcement displayed in region 538. Exemplary screen 500 may be what is displayed to a participant at step 406 of FIG. 4.

The exemplary screen 600 shown in FIG. 6 depicts bid spotter 533 requesting that the bidder confirm his bid in window 638. In this example, the bidder is assumed to have entered a $260 bid for the acoustic guitar shown in window 504 after exemplary screen 500 of FIG. 5 was displayed to him. Exemplary screen 600 may be what is displayed to a participant at step 406 of FIG. 4, after the participant places a bid.

Referring to FIG. 4, in the event that no bids have been entered or accepted at step 408, process 400 may determine whether the bidding period has passed at step 412 by consulting the timer set at step 404. If the bidding period has not passed, process 400 may go back to step 406 and new bids may be solicited by bid spotter 533 of FIG. 5. Bid spotter 533 may solicit bids more aggressively from bidders who have made previous bids on the same item or a related item. Bid spotter 533 may also solicit bids from bidders who have bought several related items through the auction site.

In the event that the bidding period has passed without new bids having been accepted at step 412 of FIG. 4, process 400 may continue to step 413. At step 413, process 400 determines whether any bids have been accepted by the auction system. If no bids have been accepted, then process 400 ends at step 422. In that case, auctioneer 522 of FIG. 5 may announce the end of the auction and indicate that there were no successful bids on the item to the participants who may have entered into the auction. Auctioneer 522 may therefore announce "Item Withdrawn".

In the event that the seller has entered a reserve price at step 212 of FIG. 2, process 400 of FIG. 4 may determine whether the reserve price has been met at step 413. If the reserve price has been met, then process 400 may continue to step 414, otherwise, process 400 may terminate at step 422. In the latter case, auctioneer 522 of FIG. 5 may announce the end of the auction to the participants, indicating that the item has been withdrawn or that the reserve price has not been met.

Referring to FIG. 4, if there has been at least one accepted bid, process 400 goes from step 413 to step 414. At step 414, process 400 may determine whether announcement "Going Once" has been made since the timer was last set or reset at step 404. If such an announcement has not been made, then process 400 may instruct auctioneer 522 of FIG. 5 to announce "Going Once" and to raise hammer 526 as an indication to participants that bidding may be coming close to an end at step 416 of FIG. 4. Referring back to step 414 of FIG. 4, if announcement "Going Once" has been made, process 400 may determine at step 418 whether announcement "Going Twice" has been made since the timer was last set or reset at step 404. If such an announcement has been made, then process 400 may instruct auctioneer 522 of FIG. 5 to announce "Sold" and process 400 may end at step 422, thereby closing the auction. If such an announcement has not been made, then process 400 may instruct auctioneer 522 of FIG. 5 to announce "Going Twice" and to raise hammer 526 as another indication to participants that bidding may be coming close to an end at step 420 of FIG. 4.

After announcement "Going Once" is made at step 416, process 400 may go back to step 404. Alternatively, after announcement "Going Twice" is made at step 420, process 400 may go back to step 404. Further to what was described above in relation to step 404, the bidding period may then be recalculated based on the current highest bid, the amount of bidding activity, and whether announcement "Going Once" or "Going Twice" has been made. In addition, the timer may be reset for counting down the newly calculated bidding period at step 404. Again, the bidding period need not be recalculated at step 404 and may be based on the previously determined bidding period. Process 400 may step through steps 406 and 408 again in order to receive bids and determine whether a new current highest bid is accepted. Process 400 may solicit bids at step 406 by causing bid spotter 533 of FIG. 5 to ask the participant who previously submitted a potentially winning bid whether he wants to raise his bid. Bid spotter 533 may encourage that participant to place another bid in region 538, or may suggest an amount which the participant may select by pressing Bid button 544 and confirming his bid through screen 600, as described in connection with FIG. 6.

As can be understood, process 400 of FIG. 4 establishes the logic that may control the flow of the auction. During that process, auctioneer 522 of FIG. 5 may continue to announce bids at step 410 of FIG. 4 while bid spotter 533 of FIG. 5 solicits further bids at step 406 of FIG. 4. When bidding appears to have stopped by virtue of the fact that there have been no new bids for a pre-determined amount of time calculated and updated at step 404 of FIG. 4, auctioneer 522 of FIG. 5 may announce "Going Once" at step 416 of FIG. 4 to see if any new bids are placed. If no new bids are placed within a pre-determined time period calculated at step 404 of FIG. 4, auctioneer 522 of FIG. 5 may announce "Going Twice" at step 420 of FIG. 4. During the periods after the "Going Once" and "Going Twice" announcements, bid spotter 533 of FIG. 5 may again solicit bids from individuals who bid earlier at step 406 of FIG. 4. If new bids are placed following the announcement of "Going Once" or "Going Twice," the auction resumes as before. If there are no further bids for a pre-determined time period calculated at step 404 and following the announcement of "Going Twice," auctioneer 522 of FIG. 5 may be adapted to bang gavel or hammer 526 on table 524 and announce "Sold," signaling the end of the auction at step 422 of FIG. 4.

Figure 9:
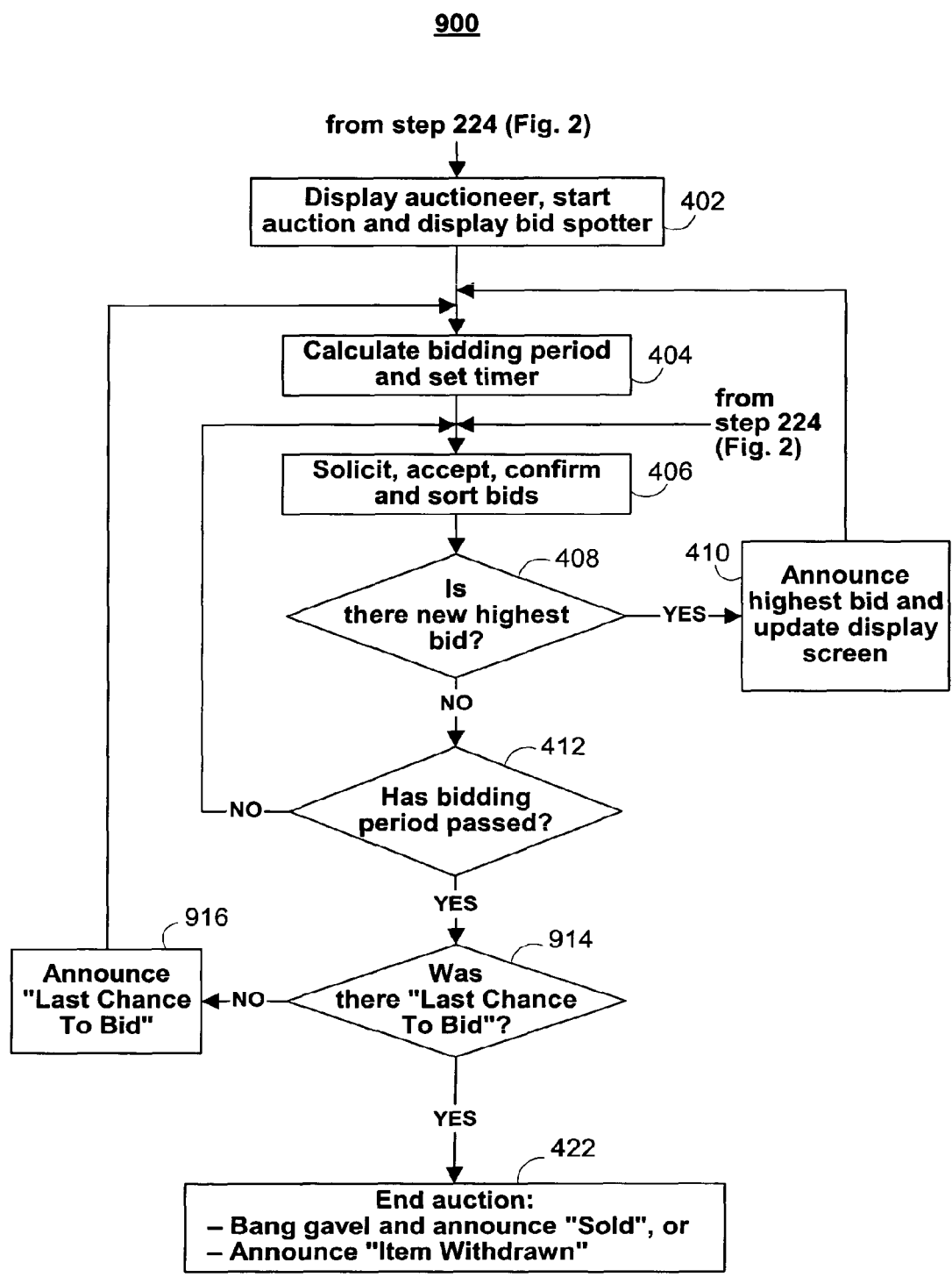
FIG. 9 is another flow diagram of a process that may be used in the execution of an auction in accordance with certain embodiments of the present invention.

FIG. 9 illustrates an alternative process 900 that may be implemented instead of process 400 of FIG. 4. Process 900 establishes another logic that may control the flow of the auction. Much like in process 400, auctioneer 522 of FIG. 5 may continue to announce bids at step 410 of process 900 while bid spotter 533 of FIG. 5 solicits further bids at step 406 of process 900. When bidding appears to have stopped by virtue of the fact that there have been no new bids for a predetermined amount of time calculated and updated at step 404 of process 900, auctioneer 522 of FIG. 5 may announce "Last Chance to Bid" at step 916 of FIG. 4. This announcement may be made after determining that it was not previously made within the same pre-determined amount of time at step 914 of process 900. Process 900 of FIG. 9 resumes as process 400 of FIG. 4 does in the event that other bids have been placed after the "Last Chance to Bid" announcement. If there are no further bids for a pre-determined time period calculated at step 404 of process 900 and following the "Last Chance to Bid" announcement, auctioneer 522 of FIG. 5 may be adapted to bang gavel or hammer 526 on table 524 and announce "Sold," signaling the end of the auction at step 422 of process 900.

Whether or not there were any bids accepted in process 900 of FIG. 9, auctioneer 522 of FIG. 5 announces "Last Chance to Bid" and bid spotter 533 of FIG. 5 may solicit bids from participants. In the event that the seller has entered a reserve price at step 212 of FIG. 2, process 900 of FIG. 9 may determine whether the reserve price was met prior to step 422. If the reserve price has been met, then auctioneer 522 of FIG. 5 may announce "Sold" at step 422 of FIG. 9. Otherwise, auctioneer 522 of FIG. 5 may announce that the item has been withdrawn, or indicate that the reserve price has not been met.

Figure 7:
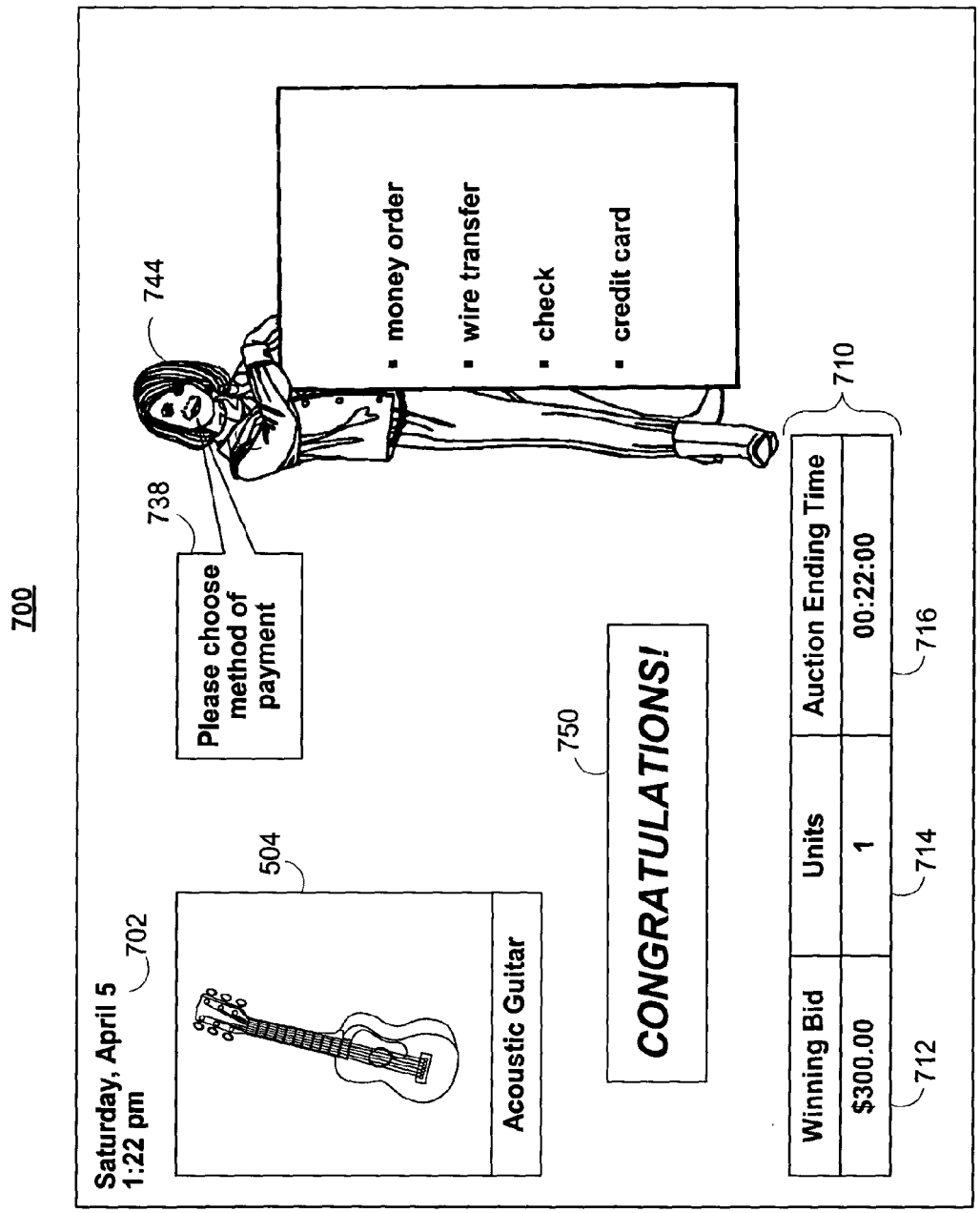
FIG. 7 is an illustration of an exemplary interactive screen that may be displayed after the conclusion of the auction process in accordance with certain embodiments of the present invention.
Figure 8:
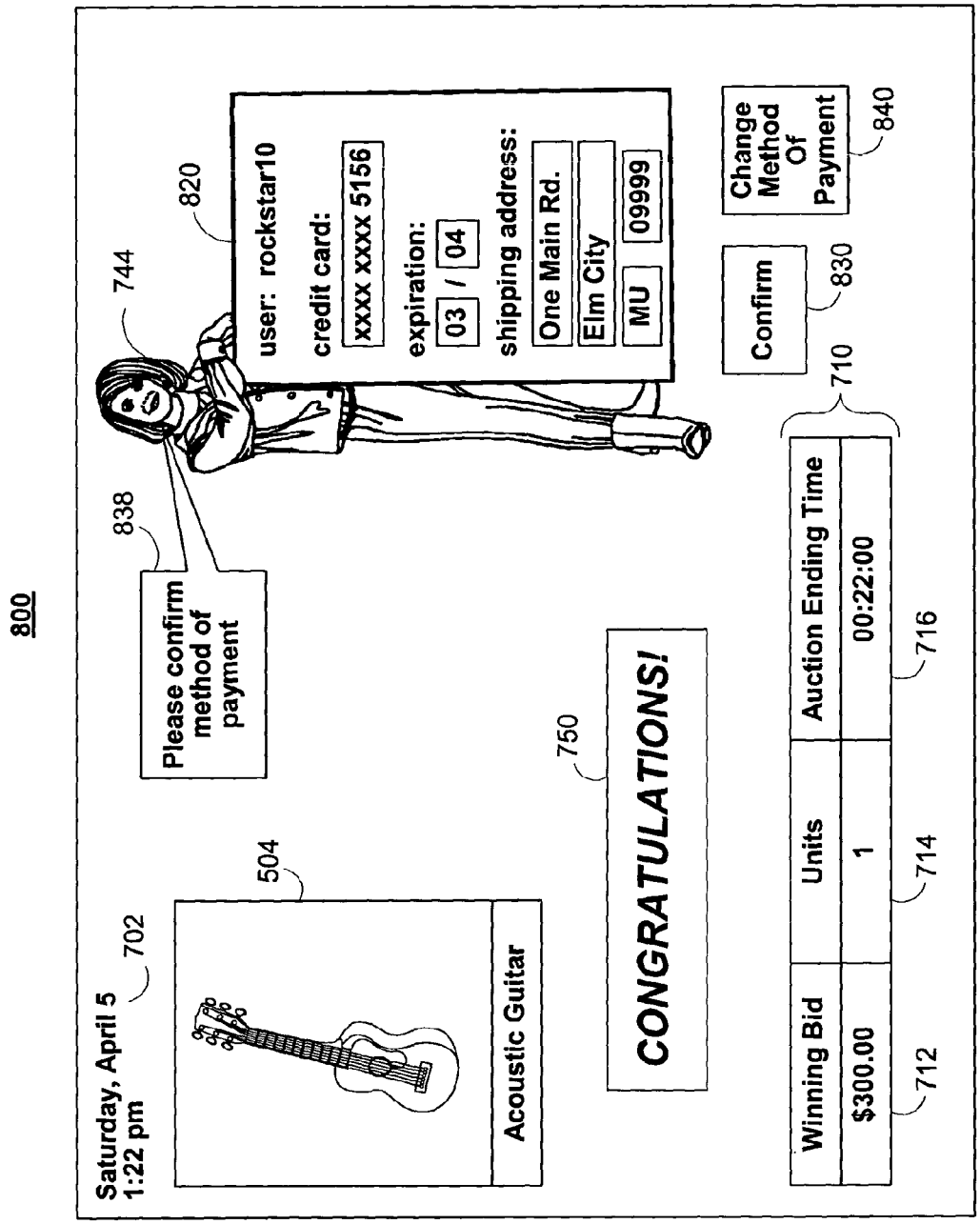
FIG. 8 is an illustration of another exemplary interactive screen that may be displayed after the conclusion of the auction process in accordance with certain embodiments of the present invention.

FIGS. 7 and 8 illustrate exemplary screens 700 and 800 that the auction system may display to the winning bidder upon close of the auction on workstation 110 of FIG. 1. Screens 700 and 800 may be displayed in the event that the reserve price (if any) has been met and in case the auction has not ended because no bids were accepted. Screens 700 and 800 may include an animated character in the form of another auction attendant 744 that may appear once the auction is concluded. Auction attendant 744 is automated and controlled by the controlling logic of system 100 depicted in FIG. 1. An auction attendant in the form of the character 744 may be the default character that is displayed to the buyer. Alternatively, the auction attendant that may be displayed to the winning bidder may be any animated character that system 100 may generate based on the buyer's preferences, profile or on the item sold. Auction attendant 744 may give the winning bidder instructions on how to proceed with payment. These instructions may be heard through the winning bidder's workstation speakers and may be displayed to that bidder in region 738 of FIG. 7 or in region 838 of FIG. 8.

Screen 700 of FIG. 7 may include window 720 which may present the winning bidder or buyer numerous payment options. In exemplary screen 700, such options include money order, wire transfer, check or credit card payment, depending on the seller's preferences. The buyer may choose among these options by clicking on the appropriate portion of window 720 and may also specify the shipping method for the item by typing it in when prompted for it.

The auction host operating the auction site may act as escrow agent, thereby serving as a counterparty between the buyer and the seller. In this case, once the buyer enters the required information, an email message may be automatically sent to the seller, informing her that the auction has ended and notifying her of the winning bid price, the payment mechanism and the shipping method. Auction attendant 744 may then thank the buyer for using the auction site. Afterwards, the seller may be directed via email to a homepage where she may enter the total balance due. After the seller completes the required fields, the buyer may be notified of that amount via email. When payment in available funds is received by the auction host, the seller may ship the item to the buyer. Following receipt of the goods in satisfactory condition by the buyer, or the expiration of a predetermined period during which the buyer may object, the auction host may release the funds to the seller.

The exemplary screen 700 shown in FIG. 7 displays window 750 congratulating the winning bidder and indicating that the winning bid for the single acoustic guitar displayed is $300.00, as can be seen in regions 712 and 714 of window 710. In this example, the auction is shown to have ended on Saturday April 5 at 1:22 pm, which is 22 minutes into the auction, as can be deduced from regions 716 and 702. Exemplary screen 700 may be displayed to a buyer whose payment and shipping information is not stored in the system.

Screen 800 of FIG. 8 may be displayed to the winning bidder once he has chosen a method of-payment in accordance with the instructions of screen 700 of FIG. 7. Alternatively, screen 800 may be displayed instead of screen 700 after the auction has ended to a participant whose payment preferences and shipping information are stored in the system. Screen 800 may contain the same elements of screen 700 of FIG. 7, with the exception of windows 820, 830, 840 and region 838. Auction attendant 744 may ask the winning bidder to confirm his payment information in region 838. The bidder's preferred payment method and information may be retrieved from the system memory and displayed to him in window 820. For example, in exemplary screen 800, the user's preferred payment method is via credit card and his shipping address is as shown. If the bidder is satisfied with the information, he may select the payment method displayed to him by pressing Confirm button 830. Otherwise, he may edit one or more fields in window 820 or select another method of payment by pressing on button Change Method Of Payment 840.

Exemplary screens 700 and 800 of FIGS. 7 and 8 may be displayed to a participant when the auction host serves as a counterparty between the buyer and seller. Alternatively, settlement of the auction may be done by name give-up. In such a scheme, auction attendant 744 may inform the buyer of the seller's identity in region 738 of FIG. 7 or region 838 of FIG. 8. The seller may also be notified of the buyer's identity via an automated email sent after the conclusion of the auction. The seller and buyer may then consummate the transaction themselves.

Upon conclusion of an auction, system 100 of FIG. 1 may be automatically adapted to search for items pertaining to the same specific category as the item purchased by the buyer. Such a search may be conducted as shown and described in connection with step 218 of FIG. 2. The search results may be displayed to the winning bidder, to a bidder who attempted to bid on the item that was won by the winning bidder, and/or to participants who have not entered any bids on the item. The system may then be adapted to step through steps 220 and 224 as described in connection with process 200 of FIG. 2 and prompt the participant as to whether he would want to enter or be taken to a different available auction on a similar or related item.

Whether or not there are similar items being auctioned, system 100 of FIG. 1 may be adapted to update the profiles of each bidder and participant by noting that such individuals demonstrated interest in a particular type of item by entering into an auction on a specific item. This may enable system 100 to alert these users via email when another auction on the same or a similar item may be created in the future. A user may choose to disable such an option in order for him not to receive future emails relating to the auctioning of related items.

One of ordinary skill in the art should appreciate that portions of the present invention may be practiced by means other than the ones described herein. For example, a potential seller may post an item for sale via email, while potential buyers may bid on auctioned items via email. Such an embodiment still makes use of the Internet. The auction site need not be hosted on the Internet's World Wide Web, however, and may be implemented on a WAN, LAN or DSL network instead. Alternatively, the seller may contact the auction site via telephone to enter information regarding an item she may wish to sell. Although some of the methods of practicing the present invention disclosed herein may-require the assistance of a person in setting up different aspects of the auction, the nature of the auction process described in connection with FIGS. 4 and 9 need not lose its automated character.

Finally, one of ordinary skill in the art should appreciate that the present invention may be practiced in embodiments other than those illustrated herein without departing from the spirit and scope of the invention, and that the invention is only limited by the claims which follow.

What is claimed is:

1. A method comprising:
receiving, via a processor in an electronic auction system, bids for an item, in which each bid comprises a bid amount and an identity of the bidder, in which at least one bid is a smart bid that automatically outbids all other bids by an incremental amount until a maximum amount is reached;
generating, via the processor, an animated character that appears on a monitor of a bidder's workstation, in which the animated character announces:
a current status of the received bids;
a start time and end time for the electronic auction a minimum bid amount for the item; and
a minimum incremental amount for each bid;
computing, via the processor after an auction period has ended, a winning bid from among the received bids, in which the winning bid has a highest bid amount at the end of the auction period; and
transmitting, via the processor, an indication of the winning bid to a remote device that is in electronic communication with the processor over a network.

2. The method of claim 1 further comprising:
receiving an indication of a reserve price for the item, in which any bids with a bid amount that falls below the reserve price is automatically rejected.

3. The method of claim 1 comprising:
generating an animated character that appears on a monitor of a bidder's workstation, in which the animated character announces a current status of the received bids.

4. The method of claim 1, in which the animated character is capable of being heard over at least one speaker that is attached to the workstation.

5. The method of claim 1, in which computing the winning bid from among the received bids further comprises:
computing that the winning bid was submitted before at least one other bid, in which the at least one other bid also has the highest bid amount at the end of the auction period.

6. The method of claim 1, in which computing the winning bid from among the received bids further comprises:
computing that a bidder of the winning bid has submitted more bids to the electronic auction system than a bidder of at least one other bid, in which the at least one other bid also has the highest bid amount at the end of the auction period.

7. The method of claim 1 further comprising:
based on previous items which were bid for or purchased by a bidder, searching for additional items that are available to purchase on the electronic auction system; and
displaying the additional items on the bidder's workstation.

8. The method of claim 1 further comprising:
in response to receiving a request to retract a previously submitted bid before the auction period has ended, rescinding the previously submitted bid.

9. The method of claim 1, in which the animated character informs the bidder that his bid has been outbid by another bid.

10. The method of claim 1, in which computing the winning bid from among the received bids further comprises:
computing that a bidder of the winning bid has participated in more auctions than a bidder of at least one other bid, in which the at least one other bid also has the highest bid amount at the end of the auction period.

11. A method comprising:
receiving, via a processor in an electronic auction system, bids for an item, in which each bid comprises a bid amount and an identity of the bidder, in which at least one bid is a smart bid that automatically outbids all other bids by an incremental amount until a maximum amount is reached;
generating, via the processor, an animated character that appears on a monitor of a bidder's workstation, in which the animated character announces a current status of the received bids,
in which the animated character announces:
a start time and end time for the electronic auction; a minimum bid
amount for the item; a minimum incremental amount for each bid; and an amount of a current highest bid;
computing, via the processor after an auction period, a winning bid from among the received bids;
computing, via the processor, that a bidder of the winning bid has submitted more bids to the electronic auction system than a bidder of at least one other bid, in which the at least one other bid also has the highest bid amount at the end of the auction period; and
transmitting, via the processor, an indication of the winning bid to a remote device that is in electronic communication with the processor over a network.

12. The method of claim 11 further comprising:
based on previous items which were bid for or purchased by a bidder, searching for additional items that are available to purchase on the electronic auction system; and
displaying the additional items on the bidder's workstation.

13. The method of claim 11 further comprising:
in response to receiving a request to rescind a previously submitted bid before the auction period has ended, rescinding the previously submitted bid.

14. An apparatus comprising:
a processor; and
a memory, in which the memory stores instructions which, when executed by the processor, direct the processor to:
receive, an electronic auction system, bids for an item, in which each bid comprises a bid amount and an identity of the bidder, in which at least one bid is a smart bid that automatically outbids all other bids by an incremental amount until a maximum amount is reached;
generate an animated character that appears on a monitor of a bidder's workstation, in which the animated character announces a current status of the received bids, in which the animated character announces:
a start time and end time for the electronic auction; a minimum bid amount for the item; a minimum incremental amount for each bid; and an amount of a current highest bid;
after an auction period has ended, compute a winning bid from among the received bids, in which the winning bid has a highest bid amount at the end of the auction period; and
transmit an indication of the winning bid.

15. The apparatus of claim 14, in which the memory further stores instructions, which when executed by the processor, direct the processor to:
receive an indication of a reserve price for the item, in which any bids with a bid amount that falls below the reserve price is automatically rejected.

16. The apparatus of claim 14, in which the animated character informs the bidder that his bid has been outbid by another bid.

17. The apparatus of claim 14, in which the memory further stores instructions, which when executed by the processor, direct the processor to:
compute that the winning bid was submitted before at least one other bid, in which the at least one other bid also has the highest bid amount at the end of the auction period.

18. The apparatus of claim 14, in which the memory further stores instructions, which when executed by the processor, direct the processor to:
compute that a bidder of the winning bid has submitted more bids to the electronic auction system than a bidder of at least one other bid, in which the at least one other bid also has the highest bid amount at the end of the auction period.

19. The apparatus of claim 14, in which the memory further stores instructions, which when executed by the processor, direct the processor to:
compute that a bidder of the winning bid has participated in more auctions than a bidder of at least one other bid, in which the at least one other bid also has the highest bid amount at the end of the auction period.

20. The apparatus of claim 14, in which the memory further stores instructions, which when executed by the processor, direct the processor to:
based on previous items which were bid for or purchased by a bidder, search for additional items that are available to purchase on the electronic auction system; and
display the additional items on the bidder's workstation.

21. The apparatus of claim 14, in which the memory further stores instructions, which when executed by the processor, direct the processor to:
in response to receiving a request to rescind a previously submitted bid before the auction period has ended, rescind the previously submitted bid.

22. An article of manufacture comprising:
a tangible, non-transitory computer-readable medium that stores instructions which, when executed by a computing device, direct the computing device to:
receive, in an electronic auction system, bids for an item, in which each bid comprises a bid amount and an identity of the bidder, in which at least one bid is a smart bid that automatically outbids all other bids by an incremental amount until a maximum amount is reached;
generate an animated character that appears on a monitor of a bidder's workstation, in which the animated character announces a current status of the received bids,
in which the animated character announces:
a start time and end time for the electronic auction; a minimum bid amount for the item; a minimum incremental amount for each bid;
and an amount of a current highest bid;
compute, after expiration of an auction period. a winning bid from among the received bids; and
transmit an indication of the winning bid.

23. The article of manufacture of claim 22, in which the computer-readable medium stores instructions which, when executed by the processor further direct the processor to:
based on previous items which were bid for or purchased by a bidder, search for additional items that are available to purchase on the electronic auction system; and
displaying the additional items on the bidder's workstation.

24. The article of manufacture of claim 22, in which the computer-readable medium stores instructions which, when executed by the processor further direct the processor to:
in response to receiving a request to rescind a previously submitted bid before the auction period has ended, rescind the previously submitted bid.

25. The article of manufacture of claim 22, in which the computer-readable medium stores instructions which, when executed by the processor further direct the processor to:
compute that the winning bid was submitted before at least one other bid, in which the at least one other bid also has the highest bid amount at the end of the auction period.

26. The article of manufacture of claim 22, in which the computer-readable medium stores instructions which, when executed by the processor further direct the processor to:
compute that a bidder of the winning bid has submitted more bids to the electronic auction system than a bidder of at least one other bid, in which the at least one other bid also has the highest bid amount at the end of the auction period.

27. The article of manufacture of claim 22, in which the computer-readable medium stores instructions which, when executed by the processor further direct the processor to:
compute that a bidder of the winning bid has participated in more auctions than a bidder of at least one other bid, in which the at least one other bid also has the highest bid amount at the end of the auction period.

* * * * *